(12) United States Patent
Enescu et al.

(10) Patent No.: US 10,432,446 B1
(45) Date of Patent: Oct. 1, 2019

(54) MIMO DECODING BASED ON QUADRANT IDENTIFICATION

(71) Applicant: NXP USA, INC., Austin, TX (US)

(72) Inventors: Andrei Alexandru Enescu, Bucharest (RO); Marius Octavian Arvinte, Focsani (RO)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/122,349

(22) Filed: Sep. 5, 2018

(30) Foreign Application Priority Data

Apr. 25, 2018 (RO) .................................. 2018 00295

(51) Int. Cl.

| | |
|---|---|
| *H04L 27/06* | (2006.01) |
| *H04L 27/34* | (2006.01) |
| *H04L 27/38* | (2006.01) |
| *H04B 1/10* | (2006.01) |
| *H04B 7/0413* | (2017.01) |

(52) U.S. Cl.
CPC ....... *H04L 27/3405* (2013.01); *H04B 1/1027* (2013.01); *H04B 7/0413* (2013.01); *H04L 27/38* (2013.01); *H04B 2001/1045* (2013.01)

(58) Field of Classification Search
CPC ... H04L 27/3405; H04L 27/38; H04B 1/1027; H04B 7/0413
USPC ........ 375/261, 262, 316, 340, 341; 714/786, 714/794
See application file for complete search history.

(56) References Cited

U.S. PATENT DOCUMENTS

| 5,374,931 | A  | * | 12/1994 | Wiener ................. G01S 13/581 |
|---|---|---|---|---|
| | | | | 342/115 |
| 10,116,417 | B1 | * | 10/2018 | Arvinte ............... H04L 27/2666 |
| 2008/0056396 | A1 | * | 3/2008 | Li ....................... H04L 25/0242 |
| | | | | 375/260 |
| 2008/0095281 | A1 | * | 4/2008 | Hosur ............... H04L 25/03184 |
| | | | | 375/347 |
| 2008/0130795 | A1 | * | 6/2008 | Chang ................. H04L 25/0228 |
| | | | | 375/329 |
| 2009/0232241 | A1 | * | 9/2009 | Shabany ............. H04B 7/0413 |
| | | | | 375/262 |
| 2010/0014606 | A1 | | 1/2010 | Chen et al. |
| 2010/0142656 | A1 | * | 6/2010 | Lee ................... H04L 25/03171 |
| | | | | 375/341 |
| 2010/0329395 | A1 | | 12/2010 | Kang et al. |

(Continued)

OTHER PUBLICATIONS

Jeon, Myeongwoon et al., "SNR Adaptive Limited Constellation Sphere Decoding," 2009 IEEE 70th Vehicular Technology Conference Fall; Sep. 20-23, 2009; 5 pages.

*Primary Examiner* — Tesfaldet Bocure

(57) ABSTRACT

A decoder decodes a set of data streams received at a receiver based on a tree search that employs a subset of decoding constellation points. The decoder can form a tree wherein each level of the tree corresponds to one of the set of data streams. Each level of the tree includes a plurality of nodes corresponding to a set of candidate constellation points, wherein the set of candidate constellation points indicating possible values of data received via the set of data streams. For tree levels beyond an initial tree level, the decoder expands each node (that is, calculates the metrics for nodes of the next tree level) for only a subset of candidate constellation points, wherein the subset of candidate constellation points is based on a sign value of the node.

20 Claims, 5 Drawing Sheets

(56) References Cited

U.S. PATENT DOCUMENTS

2012/0155579 A1 6/2012 Zilberman et al.
2018/0241591 A1* 8/2018 Rekaya-Ben Othman ..................
H04L 25/03242

* cited by examiner

US 10,432,446 B1

MIMO DECODING BASED ON QUADRANT IDENTIFICATION

CROSS-REFERENCE TO RELATED APPLICATION

The present application claims priority to Romanian Application No. RO A 2018 00295, filed on Apr. 25, 2018, entitled "MIMO DECODING BASED ON QUADRANT IDENTIFICATION," the entirety of which is incorporated by reference herein.

BACKGROUND

Field of the Disclosure

The present disclosure relates generally to data communication and more particularly to data receivers.

Description of the Related Art

Communication networks typically employ receivers to identify and decode transmitted information at endpoints of the network. For example, cellular networks employ receivers at user equipment (e.g., mobile handsets) to receive data transmitted at one or more base stations. To facilitate more reliable and efficient communication, the base stations sometimes use multiple-input multiple-output (MIMO) transmitters to take advantage of communication features such as multipath propagation. The MIMO transmitter includes multiple communication channels, with each channel transmitting data to a corresponding user equipment. However, the different signals transmitted via the multiple channels can interfere with each other, thereby complicating the user equipment receiver's task of identifying and decoding the data corresponding to the channel associated with the particular user equipment. Conventional signal decoding techniques are computation-intensive, and therefore consume an undesirably large amount of power and other receiver resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
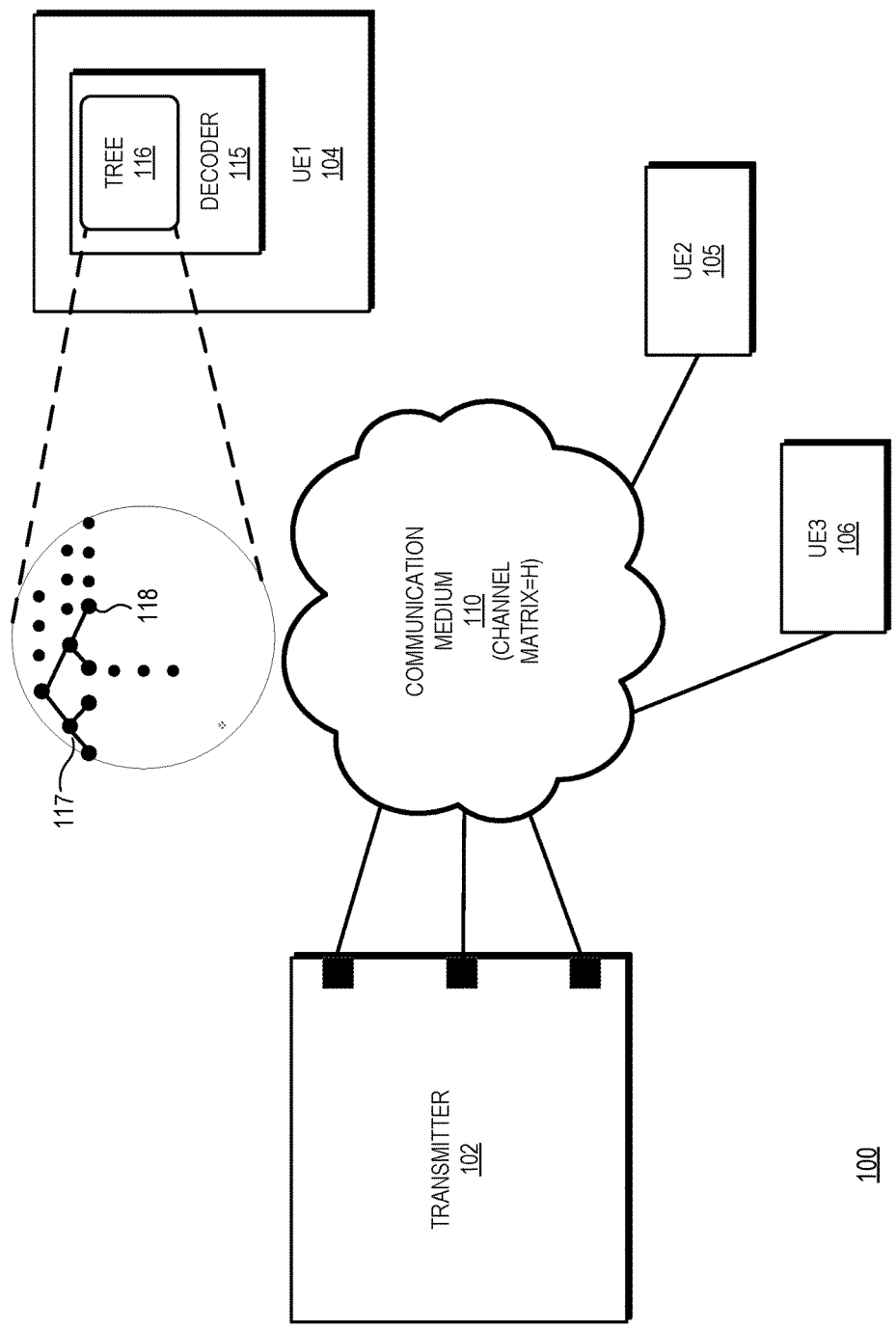
FIG. 1 is a block diagram block diagram of a communication network that employs a receiver configured to decode received signals based on a tree search that employs a subset of decoding constellation points in accordance with at least one embodiment.

FIGS. 1-7 illustrate techniques for decoding a set of data streams received at a receiver, such as a data stream transmitted by a multi-user multiple-input multiple output (MIMO) transmitter of a cellular network, based on a tree search that employs a subset of decoding constellation points. For example, the decoder can form a tree wherein each level of the tree corresponds to one of the set of data streams. Each level of the tree includes a plurality of nodes corresponding to a set of candidate constellation points, wherein the set of candidate constellation points indicating possible values of data received via the set of data streams. The decoder can therefore decode the set of data streams by executing a search of the tree based on specified metrics, such as minimum mean square error (MMSE) between the received data and the candidate constellation points. For tree levels beyond an initial tree level, the decoder expands each node (that is, calculates the metrics for nodes of the next tree level) for only a subset of candidate constellation points, wherein the subset of candidate constellation points is based on a sign value of the node. Thus, the decoder employs a reduced set of constellation points for decoding the set of data streams, thereby reducing the number of computations required for accurate decoding and thus conserving system resources.

To illustrate the reduction in the number of computations further via an example, in a typical MIMO system, the transmitter includes $N_t$ transmitting antennas transmitting a plurality of data streams to $N_r$ receiving antennas. The plurality of data streams will interfere with each other and that must be compensated for in order to ensure proper decoding at the user equipment. One technique compensates for the interference at the receiver decoder. In particular, the transmission of data streams in the MIMO system can be characterized by the following equation:

$$y = Hx + n$$

where x, y and n are column vectors of lengths $N_t$, $N_r$ and $N_r$ respectively and H is the MIMO channel matrix of size $N_r \times N_t$. The MIMO channel matrix H is based in part characteristics of the transmission medium used to communicate the plurality of data streams. The matrix x represents the data being transmitted via the plurality of data streams. The matrix n represents noise associated with the transmission and reception of the data, and the matrix y represents the data as it is received at the receive antennas.

The goal of the receiver is to process the H and y matrices to generate a matrix $x_{est}$ that is as close as possible to the matrix x (and therefore as close as possible to the originally transmitted data). The transmitted data can be represented as constellation points in a fixed constellation, such as a 16 or 64 quadrature amplitude modulation (QAM) transmission scheme. For example, in one embodiment the constellation points can be represent in a constellation diagram, which in turn is a representation of a signal modulated by a digital modulation scheme. The constellation diagram displays the signal as a two-dimensional xy-plane scatter diagram in the complex plane at symbol sampling instants. Thus, the constellation points represent possible symbols that may be selected by a given modulation scheme as points in the complex plane.

Accordingly, the goal of the decoder is to find the constellation points that are closest to the constellation points corresponding to the transmitted data. Conventionally, the receiver decoder employs a tree search, wherein each level of the tree corresponds to a different layer (that is a different received data stream). Each level of the tree includes a set of nodes, with each node corresponding to a different candidate constellation point. For an initial (first) level of the tree, the decoder calculates a node metric for each node, such as a distance between the node and the received data value. The decoder keeps the subset of nodes with the $M_1$ lowest node metrics, where M is a specified integer value. The decoder then computes node metrics for all points on the second tree level. This requires expanding all of the $M_1$ nodes with all of the candidate constellation points. Assuming there are Q candidate constellation points, the decoder will perform $Q*M_1$ node metric calculations for the second tree level. The decoder then keeps the subset of nodes of the second tree level with the $M_2$ lowest node metrics and computes the node metrics for all points on the third tree level by expanding the $M_2$ nodes with all of the candidate constellation points. The decoder proceeds in similar fashion through all levels of the tree until reaching the final tree level. Thus, using the conventional algorithm, at each tree level the selected subset of nodes having the lowest metrics (referred to as the "surviving nodes") are expanded using all Q candidate constellation points, and another set of surviving nodes is selected.

In contrast to the conventional algorithm, the techniques described herein do not perform the tree search by expanding each surviving node through the entire set Q of candidate constellation points to decode the received data streams. Instead, for each surviving node the decoder identifies a sign of the candidate constellation point corresponding to the node and selects a subset of the candidate constellation points based on the identified sign. A subset, as used herein, is defined as a set having less than all the members of the set that contains the subset. Thus, a subset of the set of all candidate constellation points contains fewer constellation points than the set of all candidate constellation points. For each level of the tree after the initial level, the decoder expands the surviving nodes using only the corresponding selected subset of candidate constellation points, rather than the entire set Q of candidate constellation points. The decoder thereby reduces the number of calculations needed to identify the constellation points corresponding to the received data streams while still providing relatively accurate identification of the constellation point.

FIG. 1 illustrates a block diagram of a portion of a communications network 100 including a transmitter 102, user equipment (UE) 104, 105, and 106, and a communication medium 110. In one embodiment the communication network 100 is a WiFi network that complies with an 802.11xx network standard. In another embodiment the transmitter 102 is a multi-user multiple-input multiple output (MU MIMO) transmitter incorporated in or co-located with a base station, such as an Evolved Node B (eNodeB) of an LTE network, and that the UEs 104-106 are each mobile handsets, such as compute-enabled mobile phones. In other embodiments, the transmitter 102 is incorporated or collocated with a wireless router device.

As indicated above, the transmitter 102 is a MU MIMO transmitter generally configured to receive data from another portion (not shown) of the cellular network, the data representing information individually targeted to different ones of the UEs 104-106. The transmitter 102 negotiates with each of the UEs 104 to 106 to establish user-specific communication channels (referred to herein as channels) with each UE, and communicates data to each of the UEs 104-106 over the corresponding channel and via the communication medium 110. Thus, in the illustrated example, the transmitter 102 establishes different communication channels to communicate data to UE 104, UE 105, and UE 106, respectively. In at least one embodiment, the transmitter 102 includes a plurality of antennas (not shown at FIG. 1) to send data over the communication medium 110, with each channel including multiple ones of the plurality of antennas. For example, in at least one embodiment each channel includes at least two antennas to communicate data, thereby supporting more reliable communication with the UEs 104-106. Further, in at least some embodiments, the transmitter 102 communicates multiple independent streams of data to each of the UEs 104-106. Thus, for example, the transmitter 102 can concurrently transmit three independent streams of data to UE 104, four independent streams of data to UE 105, and one stream of data to UE 106.

In at least one embodiment, the transmitter 102 is configured to transmit multiple streams of data to at least one user equipment concurrently. This concurrent transmission of data streams can cause cross-stream interference, reducing the reliability of the communicated data. Accordingly, to reduce cross-stream interference, the UE 104 includes a decoder 115 generally configured to decode the data for each of the data streams. In particular, the decoder 115 proceeds as follows: first the decoder 115 identifies the channel matrix H for the transmission medium 110. In at least one embodiment, the transmitter 102 determines the channel matrix H and communicates the matrix to the UE 104. For example, the transmitter 102 can determine the channel matrix H by sending one or more test signals to the UEs 104-106 for each of the data streams, receiving responsive test information from each of the UEs 104-106, and generating the channel matrix H based on the responsive test information using one or more conventional techniques. In at least one other embodiment, the transmitter 102 estimates the channel matrix H based on stored characteristics of the communication medium. In still another embodiment, the transmitter 102 generates the channel matrix H based on a combination of stored characteristics and test results from transmission of one or more test signals.

Each column of the channel matrix H corresponds to a different data stream, sometimes referred to herein as a layer. The decoder 115 orders the layers based on the norm of the corresponding column of the channel matrix H. The decoder 115 then forms a tree 116 having a plurality of levels (e.g., level 117), each level of the tree 116 corresponding to a different layer of the ordered layers. Thus, the initial (or "top") level of the tree 116 corresponds to the first layer in the order, the second level of the tree corresponds to the second layer in the order, and so on. Each level of the tree 116 includes a plurality of nodes (e.g., node 118), each node corresponding to a different candidate constellation point. Accordingly, to decode the received data streams, the decoder 115 performs a breadth-first tree search of the tree 116.

As described further herein, to perform the breadth-first tree search, for the initial level of the tree 116 the decoder 115 calculates node metrics for each node, and selects the subset $M_1$ of nodes having the lowest metrics.

For each node in the subset $M_1$, the decoder 115 determines a complex sign value for the candidate constellation point corresponding to the respective node. The decoder 115 then selects, for each node of the subset $M_1$, a corresponding subset of nodes for the next level of the tree based on the corresponding sign value. In at least one embodiment, the decoder 115 selects for the subset those nodes of the next tree level that share the same complex sign value. The decoder 115 then expands the node through only those nodes in the selected subset by calculating node metrics only for nodes in the selected subset, rather than expanding the nodes of the subset $M_1$ through all of the candidate constellation points of the next tree level. The decoder 115 thus reduces the number of calculations employed to search each tree level, reducing consumption of power and other resources at the UE 104.

In at least one embodiment, the node metrics are calculated by determining an element of a zero forcing (ZF) vector for each layer. That is, the decoder 115 calculates one new ZF element for layer n as the decoder 115 passes from layer n-1 to layer n. The decoder identifies the subset $M_1$ by identifying the closest Mk constellation points that satisfy the following formula:

$$x_{est,2}=\min(\text{abs}(z_{aux,1}-C')^2)$$

where $z_{aux}$ is the ZF estimate for the current layer, and C' is the selected subset of nodes.

Figure 2:
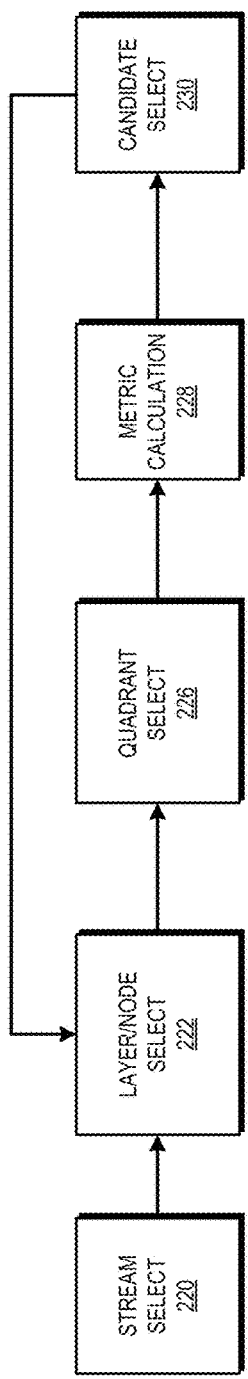
FIG. 2 is a block diagram illustrating a decoder of the receiver of FIG. 1 in accordance with at least one embodiment.

FIG. 2 illustrates the decoder 115 in accordance with at least one embodiment. In the depicted example, the decoder 115 includes a stream select module 220, a layer/node select module 222, a quadrant select module 226, a metric calculation module 228, and a candidate selection module 230. The stream select module 220 is generally configured to select the layers corresponding to the received streams in descending order according to the norm of the column of the channel matrix H, and to thereby form the tree 116. The layer/node select module 222 is generally configured to manage the traversal of the tree 116 as it is searched. Accordingly, the layer/node select module 222 initially selects the first level, and the first node of the tree 116, and selects successive nodes and levels as the tree 116 as the tree 116 is searched as described further herein.

The quadrant select module 226 is a module configured to identify a complex sign value for the currently selected node, and to select a subset of the set C of all candidate constellation points based on the identified sign value. In at least one embodiment, the quadrant select module 226 computes the complex sign value according to the following formulas:

$$B_I = \frac{1-\text{sign}\{\text{real}\{y_{k,n}\}\}}{2}$$

$$B_Q = \frac{1-\text{sign}\{\text{imag}\{y_{k,n}\}\}}{2}$$

where $y_{k,n}$ is the zero-forcing estimate for the current layer, $B_I$ is the real number portion of the sign value, and $B_Q$ is the imaginary portion of the identified sign value. In at least one embodiment, the quadrant select module 226 determines the sign values by extracting the sign bit for the value of the candidate constellation point, as expressed by the following formulas:

$$B_I=y_{R,k,n}[N-1]$$

$$B_Q=y_{I,k,n}[N-1]$$

where RI stands for the real/imaginary part of the data and $B_Q$ is the number of bits on which the data is represented (assuming bit indexing starts from 0, the MSB will be the (N-1)-th bit).

As described further herein, the quadrant select module 226 selects a subset S of the set of candidate constellation points C based on the identified sign value. In at least one embodiment, the quadrant select module 226 selects for the subset S each constellation point of the set of candidate constellation points C that have the same complex sign value as the identified sign value, where the identified sign value is the sign of the zero forcing candidate for the corresponding layer. Thus, for example, if the quadrant select module 226 determines that the complex sign value of the current node is (0,1) (that is, a positive value for the real component and a negative value for the imaginary component), the quadrant select module 226 selects for the subset S all of the constellation points of the set C having a sign value of (0,1).

In at least one embodiment, the quadrant select module 226 selects for the subset S based both on the identified sign value and a signal-to-noise ratio identified for the current data stream being decoded. For example, in at least one embodiment, the quadrant select module 226 selects for the subset S each constellation point of the set of candidate constellation points C that have the same complex sign value as the identified sign value and an additional number of constellation points of the set of candidate constellation points C, wherein the additional number is based upon the signal-to-noise ratio as described further below. This allows the decoder 115 to adjust the sensitivity of the decoding process based on the amount of noise present in the received data streams.

The metric calculation module 228 calculates node metrics for each node corresponding to the subset S of constellation points provided by the quadrant select module 226. The candidate select module 230 is configured to select, from the current set S, a threshold number of candidate constellation points having the lowest node metrics as calculated by the node metrics module 228. In at least one embodiment, the threshold number of candidate constellation points, designated threshold Z for purposes of description, can be a programmable value. In at least one embodiment, the threshold Z can be adjusted based on one or more variable criteria, such as a power mode of the UE 104. The candidate select module 230 provides the selected candidate constellation points to the layer/node select module 222 to select the next node or layer. If the layer/node select module 222 has selected the final node of the final layer of the tree 116, indicating that the tree search is complete, the candidate select module provides the selected candidate constellation points as the final set of constellation points to represent the decoded data. Thus, the candidate select module 230 selects a single constellation point for each received data stream, and stores the selected constellation point as the received data for the data stream. The stored data can be accessed by other modules (not shown) of the UE 104 to process the received data, such as forming the data for each received data stream into packets or other data units, performing error detection and correction on the received data, and the like.

Figure 3:
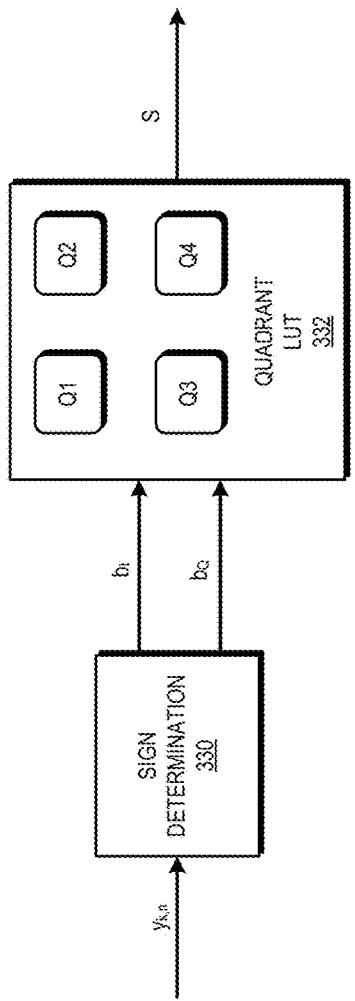
FIG. 3 is a block diagram illustrating a quadrant select module of the decoder of FIG. 2 in accordance with at least one embodiment.

FIG. 3 illustrates a block diagram of the quadrant select module 226 in accordance with at least one embodiment. In the depicted example, the quadrant select module 226 includes a sign determination module 330 and a quadrant lookup table (LUT) 332. The sign determination module 330 is generally configured to receive the value of the constellation point corresponding to the currently selected node. Based on the received value, the sign determination module 330 identifies the complex sign value for the current node as described above with respect to FIG. 2.

The quadrant LUT 332 is a lookup table structure that stores the sign values for each constellation point of the set C of candidate constellation points. For a received complex sign value, the quadrant LUT 332 identifies the candidate constellation points have the same sign value, and provides the identified candidate constellation points as the subset S.

Figure 4:
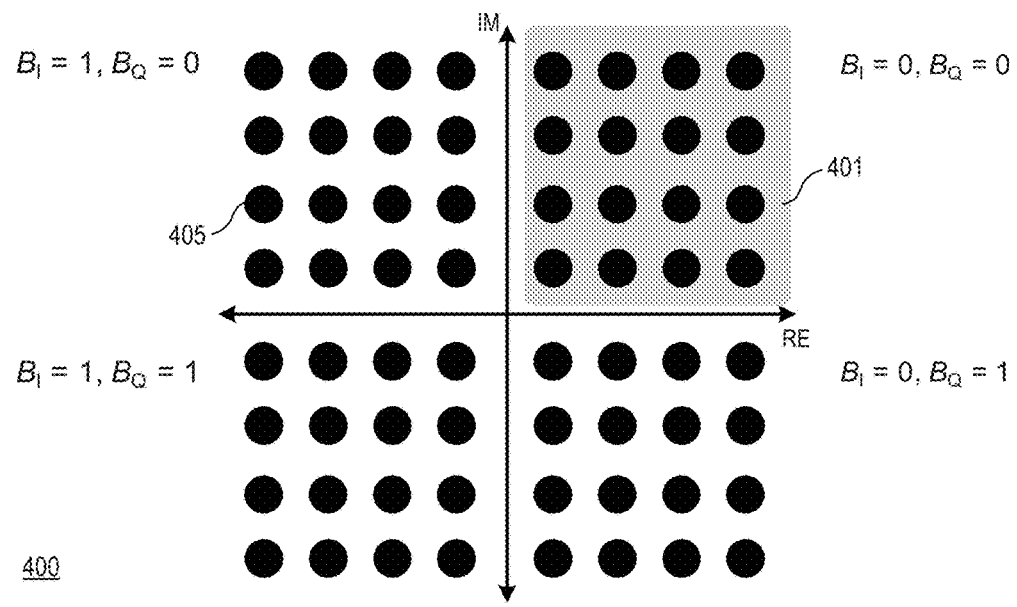
FIG. 4 is a diagram illustrating an example of the quadrant select module of FIG. 3 selecting a subset of decoding constellation points in accordance with at least one embodiment.

FIG. 4 illustrates a diagram 400 that depicts an example of the quadrant select module 226 selecting a subset of candidate constellation points in accordance with at least one embodiment. In the illustrated example, the diagram 400 depicts an x-axis representing real numbers and a y-axis representing imaginary numbers. In addition, the diagram illustrates a set C of candidate constellation points (e.g., constellation point 405) at their corresponding locations relative to the x and y axes. In the example of FIG. 4, it is assumed that the quadrant select module 226 has determined that the currently selected node has a sign value of (0,0)—that is, the currently selected node corresponds to a candidate constellation point having a positive real number value and a positive imaginary number value. In response, the quadrant select module selects for the subset S all the constellation points having a sign value of (0,0), illustrated as subset 401 at FIG. 4. Thus, the quadrant select module 226 selects those constellation points that share the same sign as the currently selected node, thereby reducing the number of calculations employed to search the tree 116 and therefore to decode the received data streams.

Figure 5:
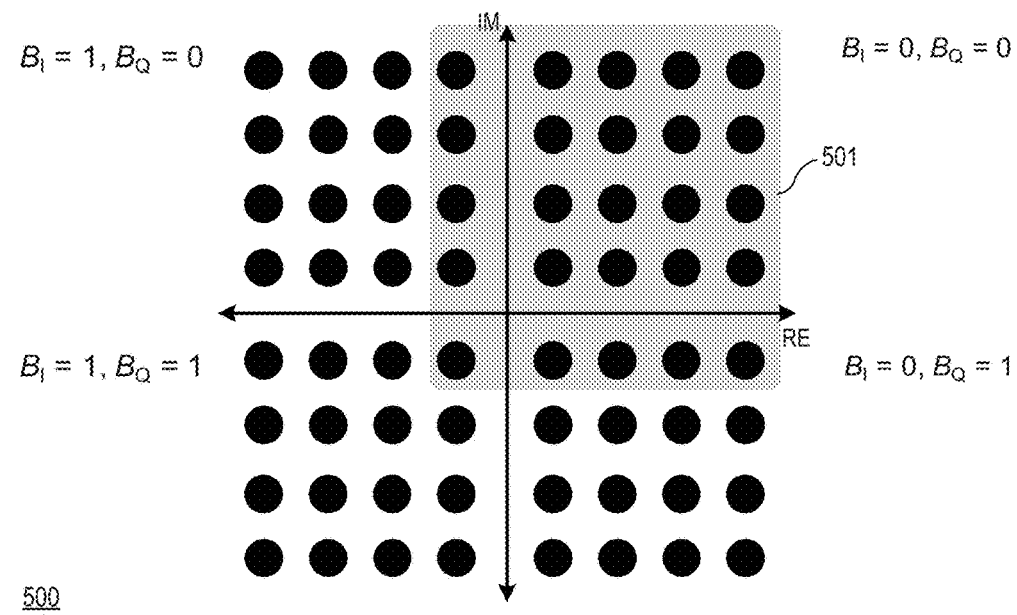
FIG. 5 is a diagram illustrating an example of selecting a subset of decoding constellation points based in part on a signal-to-noise ratio in accordance with at least one embodiment.

As noted previously, in at least one embodiment the quadrant select module 226 can add additional constellation points to the set S based on the signal-to-noise ratio of the data streams being decoded. An example is illustrated at FIG. 5 in accordance with at least one embodiment. In particular, FIG. 5 illustrates a diagram 500 arranged similarly to the diagram 400 of FIG. 4. However, in the depicted example, in addition to selecting for the subset S those constellation points that share the same sign as the currently selected node, the quadrant select module 226 selects additional constellation points based on the signal-to-noise ratio. In particular, the quadrant select module 226 extends the subset 401 symmetrically to include an additional row and column of constellation points, thereby forming the set S as the illustrated subset 501. It will be appreciated that the quadrant select module 226 can extend the subset 501 further as the signal-to-noise ratio falls, thus increasing the probability that the data streams will be correctly decoded as the noise level associated with the data streams increases.

Figure 6:
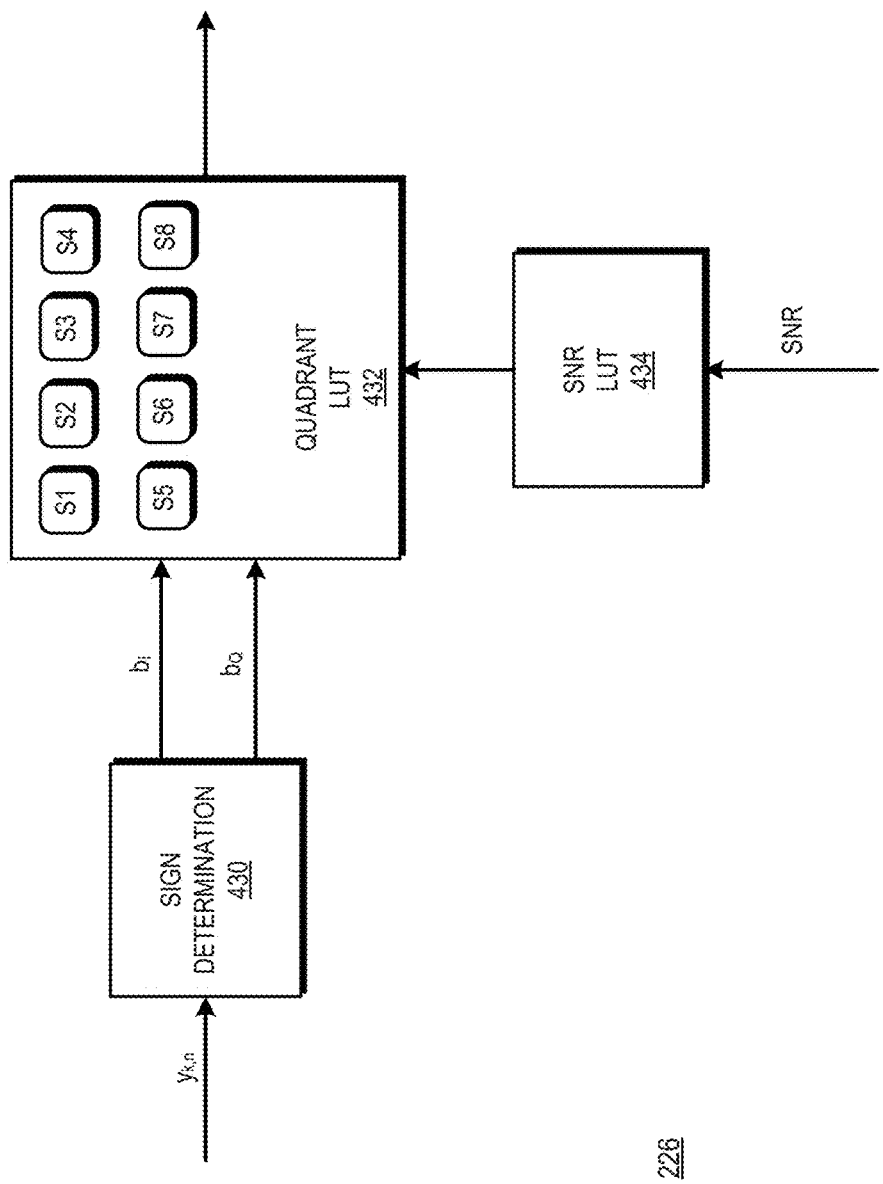
FIG. 6 is a block diagram illustrating a quadrant select module of the decoder of FIG. 2 that selects a subset of decoding constellation points based in part on a signal-to-noise ratio in accordance with at least one embodiment.

FIG. 6 illustrates a block diagram of the quadrant select module 226 that selects a subset of decoding constellation points based in part on a signal-to-noise ratio in accordance with at least one embodiment. In the depicted example, the quadrant select module 226 includes a sign determination module 430, a quadrant lookup table (LUT) 432, and a signal-to-noise ratio (SNR) lookup table (LUT) 434. The sign determination module 430 is generally configured to receive the value of the constellation point corresponding to the currently selected node. Based on the received value, the sign determination module 430 identifies the complex sign value for the current node as described above with respect to FIG. 2.

The SNR LUT 434 is a lookup table structure that stores, for each of a plurality of SNR levels, a corresponding number of constellation points that are to be added to a nominal set of constellation points. The SNR LUT 434 receives an indication from the UE 104 of the identified SNR for the received data streams, and based on the indication provides the corresponding number of constellation points.

The quadrant LUT 432 is a lookup table structure that stores the sign values for each constellation point of the set C of candidate constellation points. For a received complex sign value, the quadrant LUT 432 identifies the candidate constellation points have the same sign value, and places the identified candidate constellation points in a nominal subset. The quadrant LUT 432 then adds to the nominal subset the number of constellation points indicated by the SNR LUT 434, based on the identified sign value, thereby generating the subset S of candidate constellation points.

Figure 7:
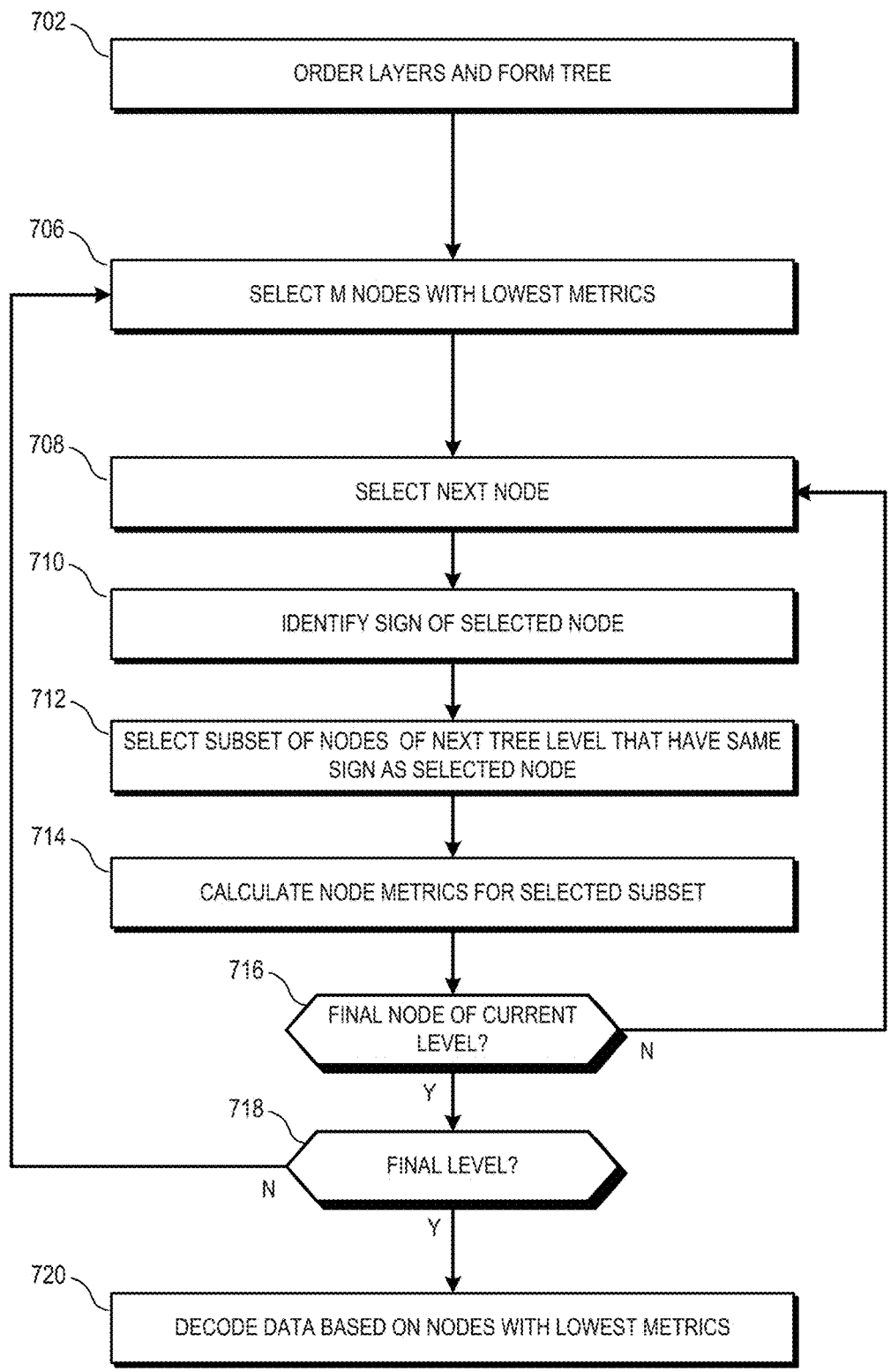
FIG. 7 is a flow diagram of a method of decoding received signals based on a tree search that employs a subset of decoding constellation points in accordance with at least one embodiment.

FIG. 7 is a flow diagram of a method 700 of decoding received signals based on a tree search that employs a subset of decoding constellation points in accordance with at least one embodiment. For purposes of description, the method 700 is described with respect to an example implementation at the decoder 115 of FIG. 2. At block 702, the stream select module 220 identifies the received streams, places them in order as described above, and forms the tree 116 based on the ordered stream layers. At block 704, the layer/node select module 222 selects the initial layer of the tree 116.

At block 706 the candidate select module 230 selects the M nodes having the lowest node metrics. At block 708 the layer/node select module selects the next level of the tree 116, and further selects the first node of the selected tree level. At block 710 the quadrant select module 226 identifies the complex sign value for the zero forcing estimate of the current layer, and block 712 selects for the subset S the nodes of the next tree level that have the same sign as the identified sign. At block 714 the metric calculation module 228 calculates node metrics for each node of the subset S.

At block 716 the candidate select module 230 determines if the current node selected at block 708 is the final node for the current level of the tree 116. If not, the method returns to block 708 and the layer/node select module 222 selects the next node of the current level. If, at block 716, the current node selected at block 708 is the final node for the current level, the method proceeds to block 718 and the candidate select module 230 determines if the current level is the final level of the tree 117. If not, the method returns to block 706 and the candidate select module 230 selects the M nodes having the lowest node metrics. If, at block 718, the current level is the final level of the tree 117, the method flow proceeds to block 720 and the candidate select module 230 decodes the data for the received data streams based on the M nodes having the lowest node metrics.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving a plurality of data streams at a receiver, the plurality of data streams comprising a first data stream;
   decoding the first data stream based on a set of candidate constellation points indicating potential symbol values for the first data stream, the decoding comprising:
      searching a tree data structure including a plurality of levels, each level of the tree data structure corresponding to a different one of the plurality of data streams, each level comprising a plurality of nodes corresponding to the set of candidate constellation points, the searching including:
         for a first node at a first level of the tree data structure, selecting a first subset of the set of candidate constellation points based on a sign value associated with the first node;
         computing a first set of node metrics for the first subset of the candidate constellation points;
         identifying a final set of constellation points based on the first set of node metrics; and
         decoding the first data stream based on the final set of constellation points.

2. The method of claim 1, wherein selecting the first subset of the candidate constellation points comprises selecting the first subset of the candidate constellation points that have the same sign value as the first node.

3. The method of claim 1, wherein selecting the first subset of the candidate constellation points comprises selecting the first subset of the candidate constellation points based on the sign value of the first node and based on a signal-to-noise ratio associated with the first data stream.

4. The method of claim 3, wherein selecting the first subset of the candidate constellation points comprises selecting a number of candidate constellation points based on the signal-to-noise ratio associated with the first data stream.

5. The method of claim 1, wherein selecting the first subset of the candidate constellation points comprises selecting a quadrant of the candidate constellation points based on the sign value of the first node.

6. The method of claim 1, wherein the sign value of the first node is a complex sign value.

7. The method of claim 1, wherein the decoding further comprises:
   for a second node at a second level of the tree data structure, selecting a second subset of the candidate constellation points based on a sign value of the second node, the second subset different from the first subset;
   computing a second set of node metrics for the second subset of the candidate constellation points; and
   identifying the final set of constellation points based on the first set of node metrics and on the second set of node metrics.

8. The method of claim 1, wherein the decoding further comprises:
   for a second node at the first level of the tree data structure, selecting a second subset of the candidate constellation points based on a sign value associated with the second node, the second subset different from the first subset;
   computing a second set of node metrics for the second subset of the candidate constellation points; and
   identifying the final set of constellation points based on the first set of node metrics and on the second set of node metrics.

9. A method, comprising:
   receiving a plurality of data streams at a receiver, the plurality of data streams comprising a first data stream and a second data stream;
   decoding the first data stream based on a set of candidate constellation points indicating potential symbol values for the first data stream, the decoding comprising:
      searching a tree including a plurality of levels, each level of the tree corresponding to a different one of the plurality of data streams, each layer comprising a plurality of nodes corresponding to the set of candidate constellation points, the searching including:
         for a first node at a first level of the tree, selecting a first subset of the candidate constellation points based on a signal-to-noise ratio associated with the first data stream;

computing a first set of node metrics for the first subset of the candidate constellation points;

identifying a first final set of constellation points based on the first set of node metrics; and decoding the first data stream based on the first final set of constellation points.

10. The method of claim 9, wherein selecting the first subset of the candidate constellation points comprises selecting a number of candidate constellation points based on the signal-to-noise ratio associated with the first data stream.

11. The method of claim 9, wherein selecting the first subset of the candidate constellation points further comprises:

identifying a sign value of the first node; and selecting the first subset of the candidate constellation points based on the identified sign value.

12. The method of claim 11, wherein selecting the first subset of the candidate constellation points comprises selecting a quadrant of the candidate constellation points based on the sign value of the first node.

13. The method of claim 11, further comprising:

decoding the second data stream based on the set of candidate constellation points, the decoding comprising:

for the first node at the first level of the tree, selecting a second subset of the candidate constellation points based on a signal-to-noise ratio associated with the second data stream, the second subset of the candidate constellation points different from the first subset of the candidate constellation points;

computing a second set of node metrics for the second subset of the candidate constellation points;

identifying a second final set of constellation points based on the first set of node metrics; and decoding the first data stream based on the second final set of constellation points.

14. A receiver comprising:

a plurality of antennas configured to receive a plurality of data streams, the plurality of data streams comprising a first data stream and a second data stream;

a decoder configured to decode the first data stream based on a set of candidate constellation points indicating potential symbol values for the first data stream, the decoder configured to:

search a tree including a plurality of levels, each level of the tree corresponding to a different one of the plurality of data streams, each layer comprising a plurality of nodes corresponding to the set of candidate constellation points;

for a first node at a first level of the tree, select a first subset of the candidate constellation points based on a sign value associated with the first node;

compute a first set of node metrics for the first subset of the candidate constellation points;

wherein the decoder is further configured to:

identify a final set of constellation points based on the first set of node metrics; and decode the first data stream based on the final set of constellation points.

15. The receiver of claim 14, wherein the decoder is configured to select the first subset of the candidate constellation points by selecting the first subset of the candidate constellation points that have the same sign value as the first node.

16. The receiver of claim 14, wherein the decoder is configured to select the first subset of the candidate constellation points based on the sign value of the first node and based on a signal-to-noise ratio associated with the first data stream.

17. The receiver of claim 16, wherein the decoder is configured to select the first subset of the candidate constellation points by selecting a number of candidate constellation points based on the signal-to-noise ratio associated with the first data stream.

18. The receiver of claim 14, wherein the decoder is configured to select the first subset of the candidate constellation points by selecting a quadrant of the candidate constellation points based on the sign value of the first node.

19. The receiver of claim 14, wherein the sign value of the first node is a complex sign value.

20. The receiver of claim 14, wherein:

the decoder is configured to, for a second node at a second level of the tree, select a second subset of the candidate constellation points based on a sign value associated with the second node, the second subset different from the first subset;

the decoder is configured to compute a second set of node metrics for the second subset of the candidate constellation points; and the decoder is configured to identify the final set of constellation points based on the first set of node metrics and on the second set of node metrics.

* * * * *